United States Patent
Nowottnick

(10) Patent No.: US 9,159,224 B2
(45) Date of Patent: Oct. 13, 2015

(54) WIRELESS POWER AND DATA APPARATUS, SYSTEM AND METHOD

(71) Applicant: NXP B.V., Eindhoven (NL)

(72) Inventor: Juergen Nowottnick, Hamburg (DE)

(73) Assignee: NXP B.V., Eindhoven (NL)

( * ) Notice: Subject to any disclaimer, the term of this patent is extended or adjusted under 35 U.S.C. 154(b) by 93 days.

(21) Appl. No.: 14/024,889

(22) Filed: Sep. 12, 2013

(65) Prior Publication Data

US 2015/0072617 A1     Mar. 12, 2015

(51) Int. Cl.
G06K 19/00     (2006.01)
G08C 17/02     (2006.01)
H04B 5/00      (2006.01)

(52) U.S. Cl.
CPC ............. *G08C 17/02* (2013.01); *H04B 5/0031* (2013.01); *H04B 5/0037* (2013.01); *H04B 5/0068* (2013.01); *H04B 5/0075* (2013.01)

(58) Field of Classification Search
USPC ............. 455/106, 12.1, 450, 452.1, 455, 502, 455/509, 427, 428, 562.1, 41.2, 572, 41.1, 455/67.15; 340/10.1, 10.3, 10.51, 572.7, 340/10.4, 8.1, 12.22, 5.25, 539.1, 572.2
See application file for complete search history.

(56) References Cited

U.S. PATENT DOCUMENTS

| | | | |
|---|---|---|---|
| 5,287,112 A * | 2/1994 | Schuermann | 342/42 |
| 5,473,330 A * | 12/1995 | Lauro et al. | 342/42 |
| 6,434,372 B1 * | 8/2002 | Neagley et al. | 455/106 |
| 6,636,721 B2 * | 10/2003 | Threadgill et al. | 455/12.1 |
| 2005/0012653 A1 * | 1/2005 | Heide et al. | 342/42 |
| 2008/0024322 A1 | 1/2008 | Riemschneider et al. | |
| 2008/0211621 A1 * | 9/2008 | Nowottnick et al. | 340/5.2 |
| 2010/0282849 A1 * | 11/2010 | Mair | 235/439 |
| 2010/0295682 A1 * | 11/2010 | August et al. | 340/572.7 |
| 2011/0270025 A1 | 11/2011 | Fridez et al. | |
| 2012/0025611 A1 | 2/2012 | Kamata et al. | |
| 2012/0105219 A1 * | 5/2012 | Kofler | 340/426.16 |
| 2012/0134444 A1 | 5/2012 | Tsukamoto | |
| 2012/0229254 A1 | 9/2012 | Nowottnick | |
| 2013/0026851 A1 | 1/2013 | Taguchi | |
| 2013/0214732 A1 | 8/2013 | Nowottnick | |

FOREIGN PATENT DOCUMENTS

WO     04001939 A1     12/2003

OTHER PUBLICATIONS

Extended European Search Report for EP Patent Appln. No. 14176498.5 (Mar. 23, 2015).
Extended European Search Report for EP Patent Appln. No. 13187468.7 (Feb. 26, 2014).

* cited by examiner

Primary Examiner — Ganiyu A Hanidu

(57)     ABSTRACT

Wireless data communication is implemented using respective carrier frequencies. As may be implemented in accordance with one or more embodiments and apparatuses herein, wireless communications are effected using a resonant circuit having a resonant frequency susceptible to detuning. Radio frequency power is transmitted to a remote transponder circuit, and wireless communications are effected with the remote transponder circuit via at least one of first and second different carrier frequencies, using the resonant circuit and the radio frequency power. The first and second carrier frequencies are respectively sufficiently proximate to the resonant frequency, such that signals communicated based on the resonant frequency can be acquired by demodulating based on the resonant frequency. One of the first and second carrier frequencies is selected based upon a signal sent from the transponder circuit.

20 Claims, 4 Drawing Sheets

WIRELESS POWER AND DATA APPARATUS, SYSTEM AND METHOD

Aspects of various embodiments of the present invention are directed to wireless power and data applications.

Many wireless communication systems employ transponders and base stations that communicate with one another. For example, transponders can be used in automotive applications for passive keyless entry (PKE) for unlocking the doors of a vehicle, or passive keyless go (PKG)/immobilizer applications for enabling an ignition circuit. Generally, transponders communicate with a base station to unlock doors and/or an automobile ignition, or otherwise enable related circuits. Many such circuits use an ISM (Industrial Scientific Medical) frequency band of about 125 kHz, which can be useful in a metal environment (as with automobiles) and is relatively insensitive to de-tuning (e.g., by touching).

In some implementations, energy used to operate such transponders can also be provided wirelessly. For instance, a low-frequency field can be provided by a base station and used to power transponders via radio frequency (RF) power, with the transponder using the power to operate circuitry to communicate with the base station. The same low-frequency field can also be used for data communications between the base station and the transponder.

In some implementations, signals are communicated using a modulation approach in which modulated signals are divided to facilitate the communication. This division can result in relatively small signal forces, which can undesirably affect sensitivity and noise resistance, and can render the system less tolerable to detuning. Other communication approaches suffer from similar conditions.

While useful for a variety of applications, such systems have often been limited in use with respect to wireless (RF) applications. These and other matters have presented challenges to the design and implementation of wireless systems for a variety of applications.

Various example embodiments are directed to methods, apparatuses, and systems involving wireless authentication, and their implementation.

According to an example embodiment involving wireless communications via a resonant circuit having a resonant frequency susceptible to detuning, an apparatus includes a transceiver circuit and a frequency-selection circuit. The transceiver circuit transmits radio frequency (RF) power to a remote transponder circuit, and wirelessly communicates with the remote transponder circuit via first and second different carrier frequencies, using the resonant circuit and the RF power. The first and second carrier frequencies are respectively set sufficiently proximate to the resonant frequency such that signals communicated based on the resonant frequency can be acquired by demodulating based on the resonant frequency. The frequency-selection circuit is coupled to the transceiver circuit and sets the carrier frequency to one of the first and second carrier frequencies based upon a signal sent from the transponder circuit.

Another embodiment is directed to an authentication apparatus for use with a vehicle drive system that operates based upon authentication of a radio-frequency-powered transponder. The apparatus includes an antenna circuit, a transceiver circuit, a demodulator circuit, a frequency-selection circuit and an authentication circuit. The transceiver circuit is coupled to the antenna circuit, and communicates both radio frequency signals and RF power via the antenna circuit using a resonant circuit having a resonant frequency susceptible to detuning. The demodulator circuit demodulates signals received from the remote transponder. The frequency-selection circuit is coupled to the transceiver circuit and selects one of first and second different carrier frequencies by transmitting a first signal to the transponder circuit via the transceiver circuit using the first carrier frequency, and selecting one of the carrier frequencies as follows. If a signal sent from the transponder circuit in response to the first signal, is correctly acquired via the demodulator circuit, the first carrier frequency is used for subsequent communications. If the signal sent from the transponder circuit in response to the first signal is not correctly acquired via the demodulator circuit, the second carrier frequency is then used for subsequent communications. The transceiver circuit uses the selected carrier frequency to further communicate authentication data with the transponder circuit. The authentication circuit authenticates the transponder based upon the authentication data, and generates an output signal indicative of the transponder authentication, the output signal being configured and arranged to facilitate operation of the vehicle drive system.

Another embodiment is directed to a method for use with wireless communications involving a resonant circuit having a resonant frequency susceptible to detuning RF power is transmitted to a remote transponder circuit, and wireless communications are effected with the remote transponder circuit via at least one of first and second different carrier frequencies, using the resonant circuit and the RF power. The first and second carrier frequencies are respectively sufficiently proximate to the resonant frequency such that signals communicated based on the resonant frequency can be acquired by demodulating based on the resonant frequency. One of the first and second carrier frequencies is selected based upon a signal sent from the transponder circuit. For instance, selecting one of the first and second carrier frequencies may include determining whether to use the first or second carrier frequencies based upon an ability to acquire signals, communicated via the resonant circuit and the first carrier frequency. Such carrier frequencies may, for example, be set sufficiently proximate to the resonant frequency such that signals communicated based on the resonant frequency can be respectively acquired by demodulating based on the first and second carrier frequencies.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
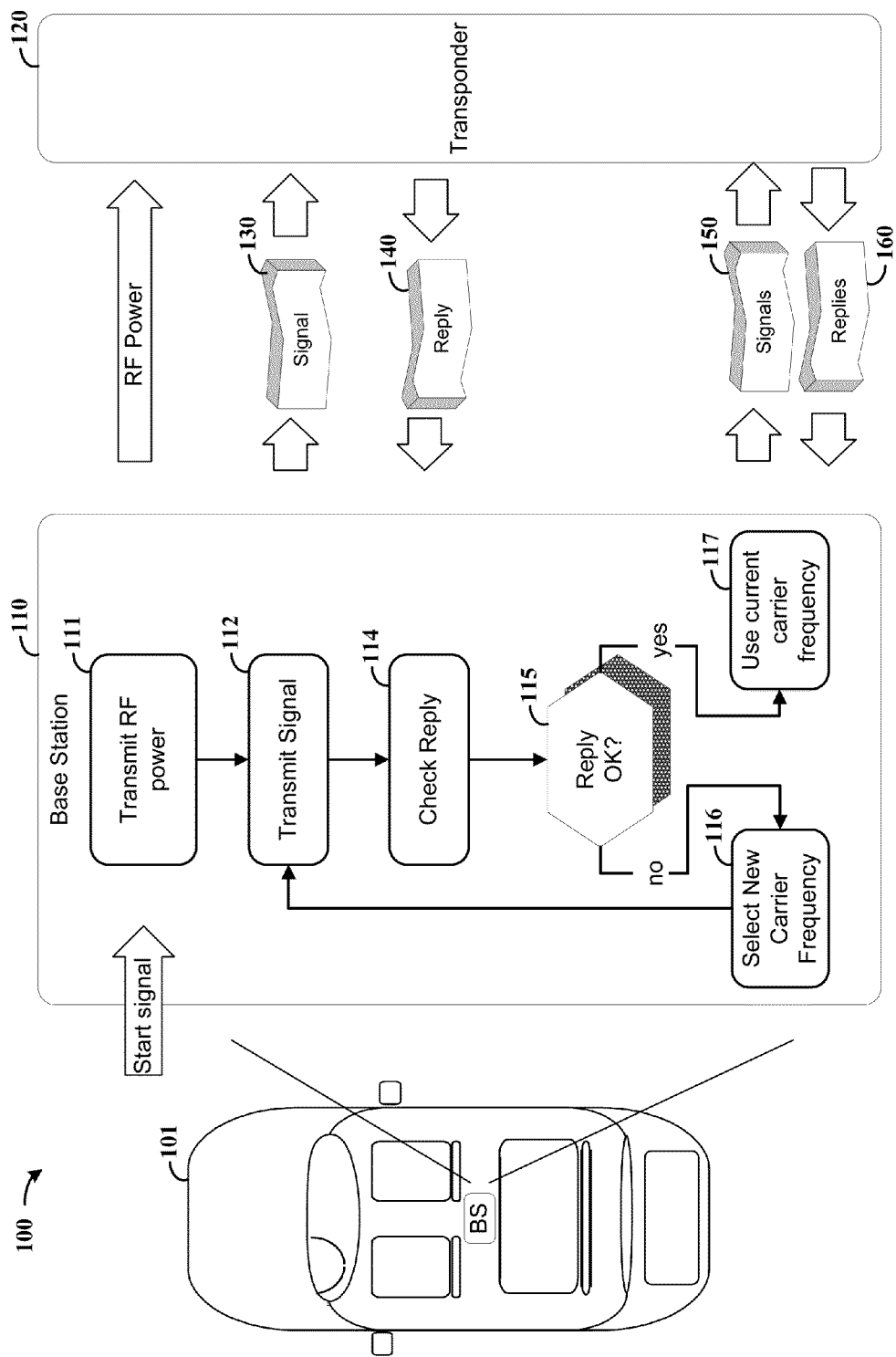
FIG. 1 shows wireless apparatuses and a system for communicating between a base station and a remote transponder, in accordance with an example embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims. In addition, the term "example" as used throughout this application is only by way of illustration, and not limitation.

Aspects of the present invention are believed to be applicable to a variety of different types of devices, systems and arrangements for involving transponder-base station coupling and wireless device powering, including those involving automotive applications. While the present invention is not necessarily so limited, various aspects of the invention may be appreciated through a discussion of examples using this context.

Various example embodiments are directed to circuits and methods that address challenges, such as those identified in the background above, and directed to communications between a base station and a transponder in which the communications include both authentication data and power for operating the transponder. Such an approach may, for example, be used in automotive applications in which the transponder is used to authenticate operation of a drive system in the vehicle, via the authentication of the communications. Such an approach may also be implemented as a backup system for entering a vehicle (e.g., as a backup to passive keyless entry), in RFID applications, and in industrial applications such as building entry control. Further, such embodiments are directed to methods, apparatuses and/or systems, which may include or employ one or more of the base station, the transponder, and circuits within one or more of the base station and transponder.

In accordance with one or more embodiments, wireless base station-transponder communications are implemented as follows. A base station transmits wireless power and a signal to a transponder using a carrier frequency, and checks for a response from the transponder. The response is evaluated and, if the response can be acquired (e.g., passes an error condition such as a cyclic redundancy check (CRC)), the carrier frequency is used for subsequent communications between the base station and transponder. If the response fails (e.g., cannot be acquired), the base station transmits a second signal to the transponder using a different carrier frequency. These and other approaches described herein may be carried out, for example, before each communication between a base station and a transponder.

In some implementations, the second signal is again checked for passing of the error condition, and if the error condition fails, a further carrier frequency is again checked. In this context, two, three or more carrier frequencies can be used to effectively broaden and acceptable range of detuning. For instance, one such approach involves communicating with a transponder over a first nominal carrier frequency that corresponds closely to a resonant frequency. If a response from the transponder to the first nominal carrier frequency fails, a second carrier frequency, having a positive carrier frequency detuning relative to the resonant frequency, is used. If a response from the transponder to the second positive carrier frequency fails, a third carrier frequency, having a negative carrier frequency detuning, is used for communicating with the transponder.

Using such approaches, base station-transponder communications are effected in a manner that is tolerant to detuning effects, such as may be present in a noisy environment, via the use of different carrier frequencies to broaden a range over which an acceptable communication (from an error perspective) can be made. For instance, issues pertaining to the use of signal demodulators, such as an envelope demodulator (e.g., a clamping based demodulator that provides an envelope that characterizes an outline of amplitude maxima and minima in the received signal), which suffers from an inability to successfully communicate signals under certain detuned conditions.

In accordance with various embodiments, the carrier frequency-selection approach described herein is implemented in with a demodulator exhibiting zero-lines (of relative frequency detuning) with respect to detuning of resonant frequencies of base station and/or transponder communications, beyond which lines signals may be indiscernible. Such a demodulator may, for example, include an envelope demodulator having zero lines beyond which signals cannot be communicated (e.g., as shown in and described in connection with FIG. 4 below).

In some embodiments, zero lines of an envelope demodulator are compensated for by changing the carrier frequency of antenna drivers of a base station. A first frequency $f_{c1}$ is applied first and a demodulation result checked, such as by CRC (e.g., determining whether a check value in the returned data from the transponder is that of the data sent to the transponder). If the first try is acceptable, the carrier frequency $f_{c2}$ is kept. If the first try fails, the carrier frequency is changed to $f_{c2}$. The resulting tolerance field of the demodulator over tolerances provided by the respective carrier frequencies may, for example, be very similar to an I/Q demodulator or an adaptive sampling time (AST) demodulator. If the resulting tolerance field is not sufficient for a particular application, the carrier frequency $f_c$ can be changed multiple times, using the first and second carrier frequencies, or additional frequencies. Testing of each carrier frequency can be carried out, for example, using short commands. Accordingly, the carrier frequency can be changed to compensate for weaknesses over detuning of the transponder and/or base station resonant circuits, by a trial and error approach. In some implementations, the carrier frequency is adapted to a self-resonant frequency of the base station. In addition, this approach can be combined with a clamping envelope demodulator approach to make the extended ASK distance available under detuning conditions.

According to another example embodiment involving wireless communications via a resonant circuit having a resonant frequency susceptible to detuning, an apparatus includes a transceiver circuit and a frequency-selection circuit that selects a frequency at which the transceiver circuit operates. The transceiver circuit transmits RF power to a remote transponder circuit, and wirelessly communicates with the remote transponder circuit via first and second different carrier frequencies, using the resonant circuit and the RF power. The first and second carrier frequencies are respectively set sufficiently proximate to the resonant frequency such that signals communicated based on the resonant frequency can be acquired by demodulating based on the resonant frequency. The frequency-selection circuit is coupled to the transceiver circuit and sets the carrier frequency to one of the first and second carrier frequencies based upon a signal sent from the transponder circuit.

A variety of carrier frequencies can be used to suit particular embodiments and applications. In some embodiments, first and second carrier frequencies as used herein are respectively higher and lower than a resonant frequency of a resonant circuit. The first carrier frequency is used in response to detuning of the resonant frequency of the resonant circuit to a frequency that is higher than the resonant frequency, and the second carrier frequency is used in response to detuning of the resonant frequency of the resonant circuit to a frequency that is lower than the resonant frequency. In certain embodiments, a determination is made as to whether to use the first or second carrier frequencies based upon an ability to acquire signals communicated with the transponder via the first carrier frequency, via the second carrier frequency, or via both carrier frequencies (e.g., in selecting a best response). The first carrier frequency used may, for example, be a most-recently used carrier frequency that provides desirable results (e.g., facilitates signal acquisition).

In some embodiments, the first and second carrier frequencies are respectively set sufficiently proximate to the resonant frequency such that signals communicated based on the resonant frequency can be respectively acquired by demodulating based on the first and second carrier frequencies. For instance, where an adequately-received and correctly-demodulated signal may be obtained within a detuning range of 10%, the first and second carrier frequencies can be set within 10% of a detuning range of the resonant frequency. Carrier frequencies that are not within a range that permits receiving and correctly demodulating a signal communicated via the resonant frequency are not sufficiently proximate the resonant frequency.

In certain embodiments, the carrier frequency is set to the first carrier frequency in response to a signal from the transponder circuit being tuned relative to the first carrier frequency, and is set to the second carrier frequency in response to a signal from the transponder circuit being tuned relative to the second carrier frequency. In certain embodiments, the carrier frequency is set to the first carrier frequency in response to a signal from the transponder circuit being tuned relative to the first carrier frequency as follows. A first signal is transmitted to the transponder using the first carrier frequency, and a response signal sent by the transponder is checked as to whether it can be acquired via the demodulation. If the response signal can be acquired, the first carrier frequency is used. If the signal is not acquired, a second signal is transmitted to the transponder using the second carrier frequency. A response by the transponder to this second signal can further be checked to determine whether it can be acquired, and a similar process can be carried out with third, fourth and more signals, if desired. Further, a carrier frequency may be dynamically selected based upon detuned characteristics of the signals.

Turning now to the Figures, FIG. 1 shows wireless apparatuses for communicating between a base station and a remote transponder, in accordance with an example embodiment. The apparatus 100 includes a base station 110 and a transponder 120 that is powered by the base station 110, with the base station and transponder communicating with one another to facilitate authentication of the transponder. Some embodiments are directed to the base station 110 alone, other embodiments are directed to the transponder 120 alone, and still other embodiments are directed to the apparatus 100 as including both the base station and the transponder.

The base station operates at block 111 to transmit RF power for powering the transponder 120, and also transmits signals at block 112, with signal 130 shown by way of example. The base station 110 uses the transmitted RF power to generate and transmit a reply signal 140 to the base station.

Accordingly, the signal The base station 110 checks the reply signal 140 for errors at block 114. This checking may involve, for example, checking for a known pattern, a serial number of the transponder and/or a corresponding cyclic redundancy check (CRC) value. This error checking is useful, for example, for determining whether a carrier frequency used in communicating between the base station 110 and transponder 120 carries a proper signal, as may be affected by frequency detuning or noise. If the reply signal is checked as being correct at block 115, the current carrier frequency is used at block 117 for further communications. Such a correct signal may, for example, be determined via an error check, a correctly demodulated (constant) pattern being exhibited by the signal (e.g., four fixed bits such as a product identification number are correctly received), or a threshold signal characteristic is met. If the reply signal is not checked as being correct, a new carrier frequency is selected at block 116, and the process continues at block 112 as above. The checking approach is thus indicative of whether a signal sent from the transponder 120 passes or fails an error condition corresponding to a threshold level at which the communicated signals can be acquired (e.g., via demodulating). Once a particular carrier frequency is selected, communications 150 and 160 are carried out using that selected carrier frequency. sent from the transponder 120 indicates, by way of amenability to accurate demodulation at the transceiver, that a resonant circuit at the base station 110, transponder 120 or both, is not detuned (or are not collectively detuned) beyond a threshold level for acquiring the signal using the first carrier frequency. Using this approach, two or more different carrier frequencies can be used to address situations as discussed in the background above and otherwise, where detuning or noise can raise issues with a communication on a particular carrier frequency. The carrier frequencies can be selected and offset relative to one another to suit particular embodiments. For instance, the carrier frequencies can be offset such that each carrier frequency partially overlaps, or covers a particular range.

In various embodiments, the base station 110 and/or the transponder 120 use authentication circuits that use data in the respective signals for authentication, tailored for a particular application. For instance, the transponder 120 may be programmed to respond to data from the base station based upon a comparison or other authentication of data received from the base station. Similarly, the base station 110 may be programmed to authenticate communications received from the transponder based upon a comparison or other authentication of data therein (e.g., by ensuring that the transponder communication includes a particular key or other type of data that can be used to verify that the transponder is intended for operation with the base station, such as for providing exclusive access to a vehicle). Such applications may involve, for example, authenticating the transponder as being present, prior to enabling an automotive drive system circuit for enabling the drive system. For general information regarding base stations, transponders, communications therebetween and authentication, and for specific information regarding methods, systems, base stations or transponders that may be implemented with one or more embodiments discussed herein, reference may be made to U.S. Patent Publication No. 2008/0024322 and U.S. Patent Publication No. 2012/0229254, which are fully incorporated herein by reference.

Figure 2:
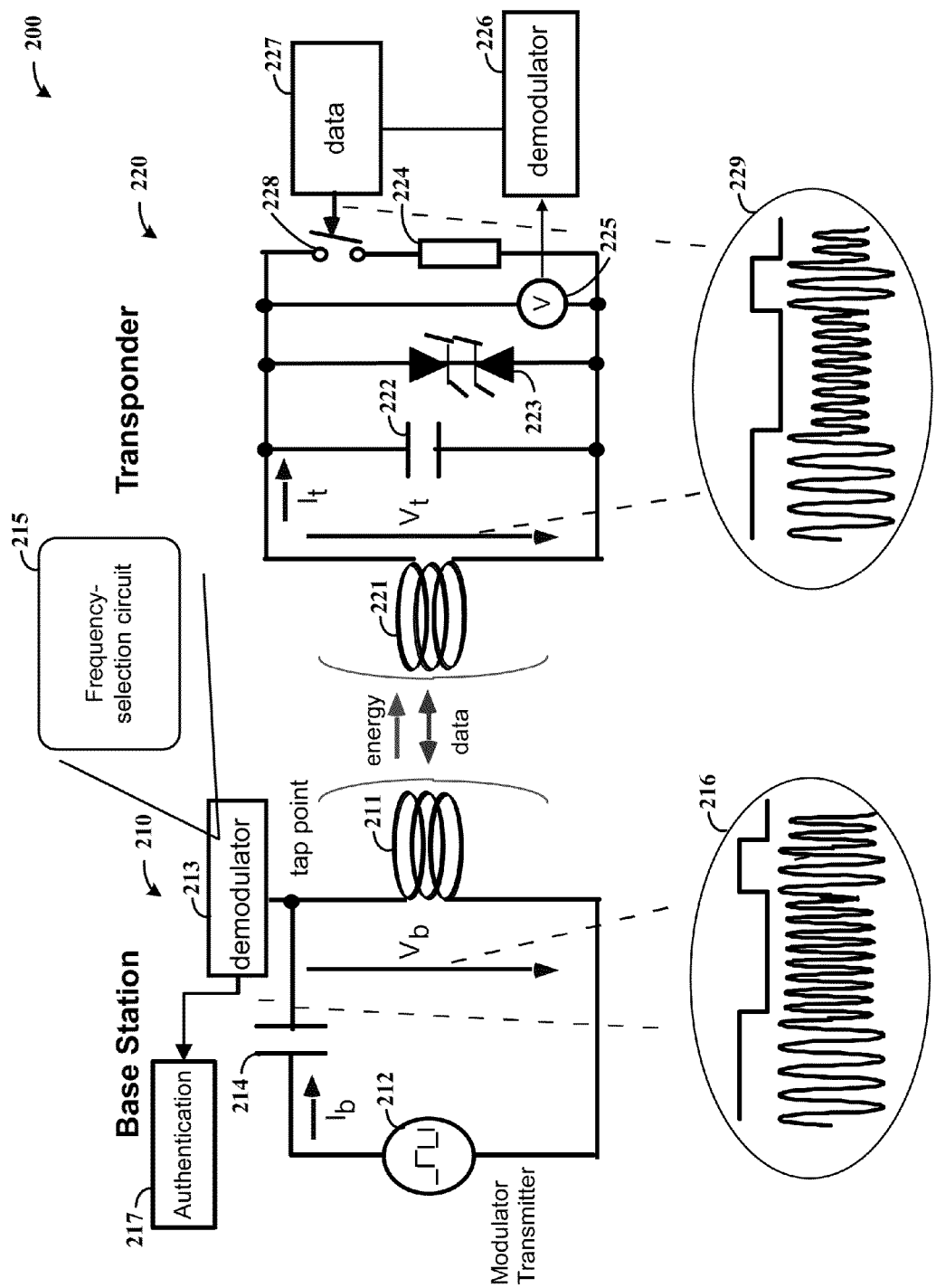
FIG. 2 shows a wireless apparatus and system for communicating between a base station and a remote transponder, in accordance with another example embodiment.

FIG. 2 shows a wireless apparatus and system 200 for communicating between a base station 210 and a remote transponder 220, in accordance with one or more example embodiments. As with FIG. 1, various embodiments are directed to one or both of the base station 210 and remote transponder 220. The base station 210 includes an antenna 211, a transmitter modulator 212, a demodulator 213 for demodulating received signals, and a capacitor 214 (e.g., and part of a resonant circuit). The antenna 211 transmits both RF power and data. The demodulator 213 includes a frequency-selection circuit 215 that operates to select a carrier frequency to use in communicating with the remote transponder 220. The transmitter modulator 212 operates using one of two or more carrier frequencies, corresponding to the frequency selected by the frequency-selection circuit 215.

The remote transponder 220 includes an antenna 221, capacitor 222, diode circuit 223, resistor 224, and power supply 225. A demodulator circuit 226 demodulates received signals, and data circuit 227 provides data for responding to the base station 210 (e.g., for authentication). Switch 228 selectively couples the data circuit 227 to facilitate the receipt and transmission of data at the transponder. The antenna 221 also receives both RF power and data, with the respective circuits therein operating to use the power to generate and transmit a response signal for authentication.

Transmissions between the base station 210 and remote transponder 220 are carried out using respective carrier frequencies as discussed herein, with the frequency-selection circuit 215 at base station 210 performing an error check upon an initially-used carrier frequency (e.g., selected using a last-used carrier frequency), and selectively using that carrier frequency or a different carrier frequency based upon that error check. Amplitude and/or phase modulation may be used to carry data. Signals 216 and 229 are shown by way of example. In some implementations, the carrier frequency is re-selected in response to a condition relating to the communications between the base station and the transponder.

The apparatuses and/or system as shown in FIG. 2 may be used in a variety of applications. In some embodiments, the apparatus is used with an automobile such as shown in FIG. 1, with base station 210 being implemented therein along with an authentication circuit 217. Successfully received communications from the remote transponder 220 (e.g., after a frequency selection sequence) are demodulated and passed from the demodulator 213 to the authentication circuit 217. The authentication circuit 217 can be implemented in a variety of manners, and in one embodiment, authenticates demodulated communications and, based on the authentication, generates a signal that permits and/or actively engages operation of a vehicle drive system.

Figure 3:
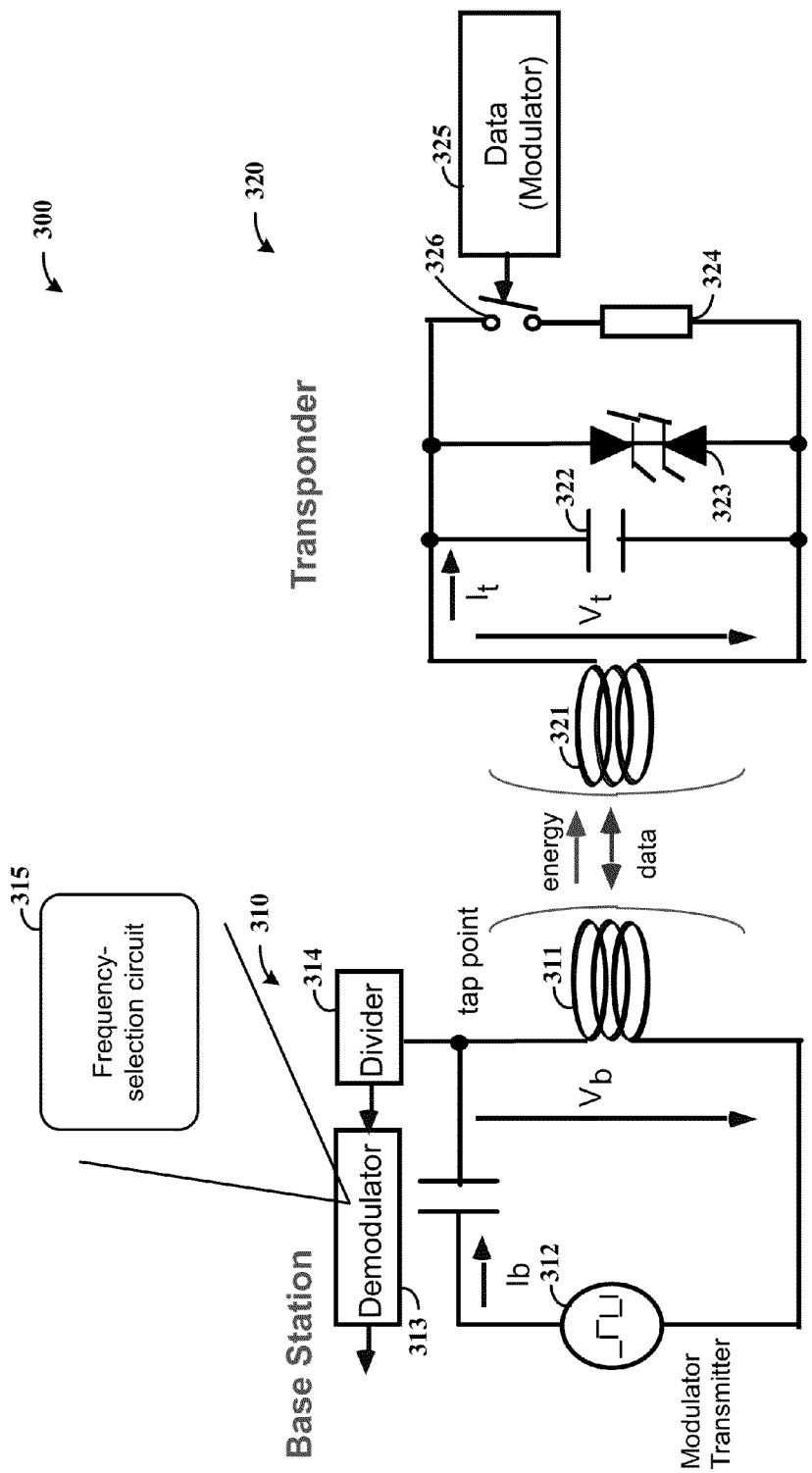
FIG. 3 shows a wireless apparatus and system for communicating between a base station and a remote transponder, in accordance with another example embodiment.

FIG. 3 shows a wireless apparatus and system 300 for communicating between a base station 310 and a remote transponder 320, in accordance with another example embodiment. Various embodiments are directed to one or both of the base station 310 and remote transponder 320 implemented separately, or together as a system 300. The base station 310 is similar to base station 210 in FIG. 2, with antenna 311, transmitter modulator 312 and demodulator 313, and also including a divider 314 (e.g., for modulation/communication approaches as discussed above, which implement such aspects). The demodulator 313 includes a frequency-selection circuit 315, which operates to select a carrier frequency to use based upon an error check as discussed herein, to determine whether an initial carrier frequency is adequate. The transmitter modulator 312 operates using one of two or more carrier frequencies, corresponding to the frequency selected by the frequency-selection circuit 315.

The remote transponder 320 includes an antenna 321, capacitor 322, diode circuit 323, resistor 324, data modulator circuit 325 and switch 326. Data modulator circuit 325 provides modulated data for responding to the base station 310 (e.g., for authentication). Switch 326 selectively couples the data modulator circuit 325 to facilitate the transmission of data at the transponder. The antenna 321 also receives both RF power and data, with the respective circuits therein operating to use the power to generate and transmit a response signal for authentication.

Figure 4:
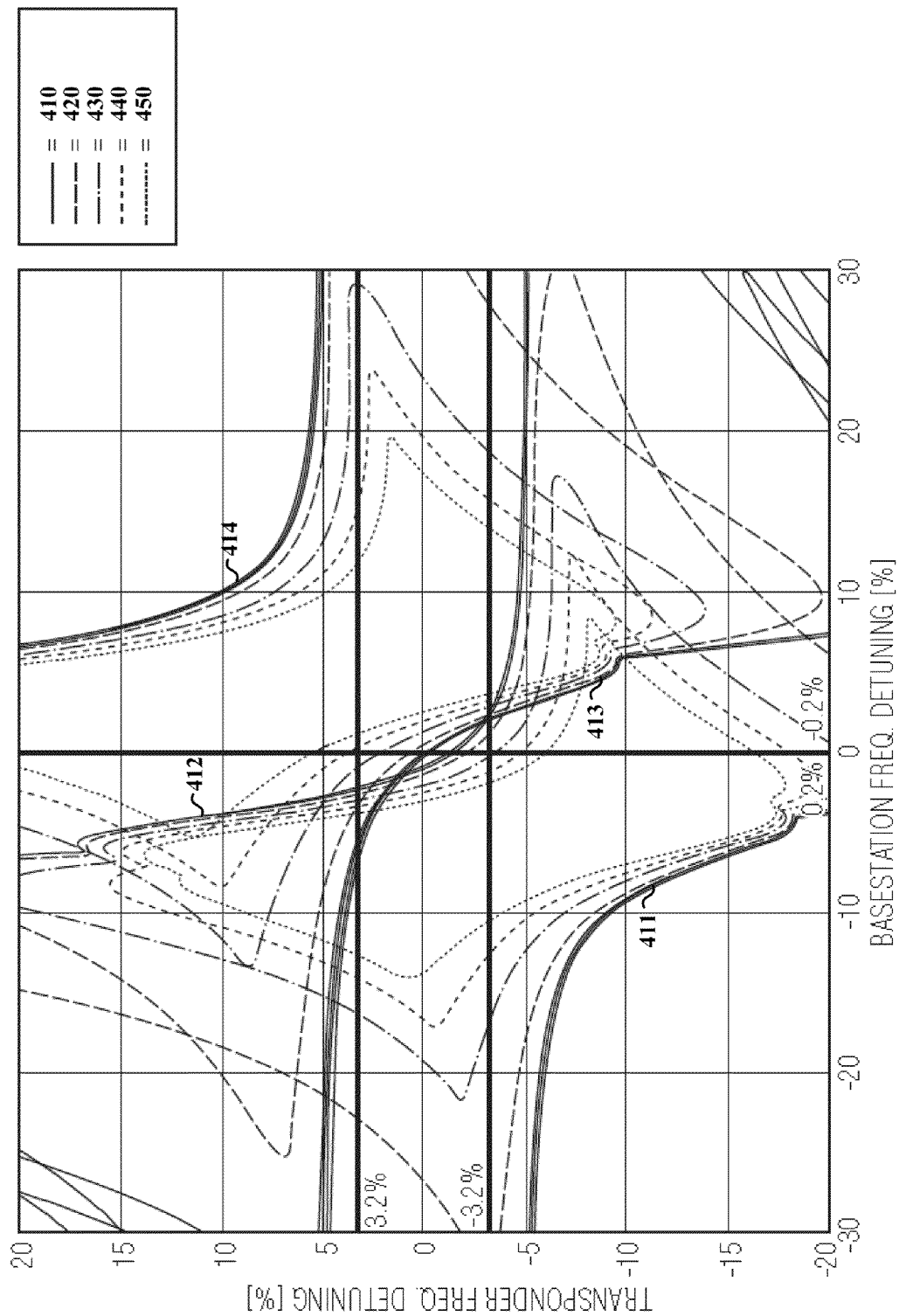
FIG. 4 shows plots of respective carrier frequencies as implemented in connection with one or more example embodiments.

FIG. 4 shows plots of respective carrier frequencies as implemented in connection with one or more example embodiments. Solid lines 410 are zero lines for the respective first and second carrier frequencies, with the zero lines of the first carrier frequency range bound at 411 and 412, and the zero lines of the second carrier frequency range bound at 413 and 414. Respective lines 420, 430, 440 and 450 show lines of increasing signal power for respective ranges of resonant frequency detuning. By using the respective carrier frequencies as shown, an overall operation of a base station-transponder communication approach provides a broad range of carrier frequency over which signals can be properly communicated. This can be used, for example, to address issues relating to detuning and noise.

Accordingly, various apparatuses as described herein, such as one or more authentication apparatuses, can be implemented using carrier frequencies as shown, with overlapping responses to signals communicated via a resonant circuit at respective ranges of detuning. In some embodiments, the authentication apparatus also includes the transponder circuit, which also includes an antenna circuit, and an RF power circuit that receives and uses the RF power to power another transceiver circuit that generates and transmits the response signal. In certain embodiments, the transceiver circuit receives signals from the transponder by using the first carrier frequency based upon a first range of detuning of the resonant circuit, and by using the second carrier frequency based upon a second range of detuning of the resonant circuit. The second range is different than the first range, with the first and second ranges overlapping a range of the detuning and being predominantly mutually exclusive of one another.

The circuitry and functions discussed herein, such as for demodulation and/or authentication, may be implemented using one or more of a variety of circuits. For instance, discrete logic circuits or programmable logic circuits may be configured and arranged for implementing these operations/activities, as shown in the Figures and described above. In certain embodiments, a programmable circuit includes one or more computer type circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions. Such circuits may, for example, communicate in an automotive type circuit for operating vehicle systems, such as for activating a vehicle drive system component, or as a backup system for unlocking a door for vehicle entry. Other approaches involve controlling building access, and RFID tags.

Based upon the above discussion and illustrations, those skilled in the art will readily recognize that various modifications and changes may be made to the present invention without strictly following the exemplary embodiments and applications illustrated and described herein. For example, different types of signals can be used for communicating between base stations and responders, as may a variety of carrier frequencies. Such modifications do not depart from the true spirit and scope of the present invention, including that set forth in the following claims.

What is claimed is:

1. For use with wireless communications involving a resonant circuit having a resonant frequency susceptible to detuning, an apparatus comprising:
   a remote transponder circuit;
   a transceiver circuit configured and arranged to
      transmit radio frequency (RF) power to the remote transponder circuit, and
      wirelessly communicate with the remote transponder circuit via first and second different carrier frequencies, using the resonant circuit and the RF power, the first and second carrier frequencies being respectively set sufficiently proximate to the resonant frequency such that signals communicated based on the resonant frequency can be acquired by demodulating based on the resonant frequency; and a frequency-selection circuit coupled to the transceiver circuit and configured and arranged to set the carrier frequency to one of the first and second carrier frequencies based upon a signal sent from the transponder circuit, wherein the frequency-selection circuit is configured and arranged to set the carrier frequency to one of the first and second carrier frequencies based upon a determination of whether the signal sent from the transponder circuit passes or fails an error condition corresponding to a threshold level at which the communicated signals can be acquired via the demodulating.

2. The apparatus of claim 1, wherein the first and second carrier frequencies are respectively higher and lower than the resonant frequency, and wherein the frequency-selection circuit is configured and arranged to set the carrier frequency to the first carrier frequency in response to detuning of the resonant frequency of the resonant circuit to a frequency that is higher than the resonant frequency, and set the carrier frequency to the second carrier frequency in response to detuning of the resonant frequency of the resonant circuit to a frequency that is lower than the resonant frequency.

3. The apparatus of claim 1, wherein the frequency-selection circuit is configured and arranged to determine whether to use the first or second carrier frequencies, based upon an ability to acquire signals communicated with the transponder circuit via the first carrier frequency.

4. The apparatus of claim 1, wherein the first and second carrier frequencies are respectively set sufficiently proximate to the resonant frequency, such that signals communicated based on the resonant frequency can be respectively acquired by demodulating based on the first and second carrier frequencies.

5. The apparatus of claim 1, wherein the frequency-selection circuit is configured and arranged to set the carrier frequency to the first carrier frequency in response to a signal from the transponder circuit being tuned relative to the first carrier frequency, and set the carrier frequency to the second carrier frequency in response to a signal from the transponder circuit being tuned relative to the second carrier frequency.

6. The apparatus of claim 5, wherein the frequency-selection circuit is configured and arranged to set the carrier frequency to the first carrier frequency in response to a signal from the transponder circuit being tuned relative to the first carrier frequency, by transmitting a first signal to the transponder circuit using the first carrier frequency and checking whether a signal sent by the transponder circuit, in response to the transmitted first signal via the first carrier frequency, can be acquired via the demodulation, and set the carrier frequency to the second carrier frequency in response to the transmitted first signal not being acquired via the demodulation, by transmitting a second signal to the transponder circuit using the second carrier frequency and checking whether a signal sent by the transponder circuit, in response to the transmitted second signal via the second carrier frequency, can be acquired via the demodulation.

7. For use with wireless communications involving a resonant circuit having a resonant frequency susceptible to detuning, an apparatus comprising:

a transceiver circuit configured and arranged to transmit radio frequency (RF) power to the a remote transponder circuit, and wirelessly communicate with the remote transponder circuit via first and second different carrier frequencies, using the resonant circuit and the RF power, the first and second carrier frequencies being respectively set sufficiently proximate to the resonant frequency such that signals communicated based on the resonant frequency can be acquired by demodulating based on the resonant frequency; and a frequency-selection circuit coupled to the transceiver circuit and configured and arranged to set the carrier frequency to one of the first and second carrier frequencies based upon a signal sent from the transponder circuit, wherein the signal sent from the transponder circuit indicates, by way of amenability to accurate demodulation at the transceiver circuit, that the resonant circuit is not detuned beyond a threshold level for acquiring the signal using the first carrier frequency.

8. The apparatus of claim 7, wherein the frequency-selection circuit is configured and arranged to set the carrier frequency to one of the first and second carrier frequencies based upon a determination of whether the signal sent from the transponder circuit passes or fails an error condition corresponding to a threshold level at which the communicated signals can be acquired via the demodulating.

9. The apparatus of claim 1, further including the resonant circuit.

10. The apparatus of claim 7, further including the transponder circuit.

11. The apparatus of claim 1, wherein the transponder circuit includes the resonant circuit.

12. The apparatus of claim 1, wherein the apparatus includes the resonant circuit, the transponder circuit includes a second resonant circuit, and the frequency-selection circuit is configured and arranged to set the carrier frequency to one of the first and second carrier frequencies based upon a signal sent from the transponder circuit and detuning characteristics of at least one of the resonant circuits.

13. The apparatus of claim 1, wherein the transceiver circuit includes a demodulator circuit configured and arranged to demodulate signals received from the transponder circuit.

14. The apparatus of claim 1, wherein the transceiver circuit includes an envelope demodulator circuit configured and arranged to demodulate signals received from the transponder circuit by providing an output for each received signal that includes an envelope that characterizes an outline of amplitude maxima and minima in the received signal.

15. For use with a vehicle drive system that operates based upon authentication of a radio-frequency-powered transponder, an authentication apparatus comprising:

a remote transponder circuit;

an antenna circuit;

a transceiver circuit coupled to the antenna circuit and configured and arranged to communicate radio frequency signals via the antenna circuit, and to transmit wireless radio frequency power that powers the remote transponder circuit via the antenna circuit, using a resonant circuit having a resonant frequency susceptible to detuning;

a demodulator circuit configured and arranged to demodulate signals received from the remote transponder circuit;

a frequency-selection circuit coupled to the transceiver circuit and configured and arranged to select one of first and second different carrier frequencies, by using the first carrier frequency, transmitting a first signal to the transponder circuit via the transceiver circuit, if a signal sent from the transponder circuit in response to the first signal is correctly acquired via the demodulator circuit, selecting the first carrier frequency for subsequent communications, and if a signal sent from the transponder circuit in response to the first signal is not correctly acquired via the demodulator circuit, selecting the second carrier frequency for subsequent communications, wherein the frequency-selection circuit is configured and arranged to set the carrier frequency to one of the first and second carrier frequencies based upon a determination of whether the signal sent from the transponder circuit passes or fails an error condition corresponding to a threshold level at which the communicated signals can be acquired via the demodulating, wherein the transceiver circuit is configured and arranged with the frequency-selection circuit to use the selected carrier frequency to further communicate authentication data with the transponder circuit; and an authentication circuit configured and arranged to authenticate the transponder circuit based upon the authentication data, and generate an output signal indicative of the transponder circuit authentication, the output signal being configured and arranged to facilitate operation of the vehicle drive system.

16. The apparatus of claim 15, the transponder circuit including:

a second antenna circuit;

an RF power circuit configured and arranged to provide power in response to receiving the RF power transmitted by the transceiver circuit; and a second transceiver circuit configured and arranged to use the provided power to generate and transmit the response signal.

17. The apparatus of claim 15, wherein the transceiver circuit is configured and arranged to receive signals from the transponder circuit using the first carrier frequency, based upon a first range of detuning of the resonant circuit, and receive signals from the transponder circuit using the second carrier frequency, based upon a second range of detuning of the resonant circuit that is different than the first range, the first and second ranges overlapping a range of the detuning, and the first and second ranges being predominantly mutually exclusive of one another.

18. For use with wireless communications involving a resonant circuit having a resonant frequency susceptible to detuning, a method comprising:

transmitting RF power from a base station to a remote transponder circuit;

wirelessly communicating with the remote transponder circuit via at least one of first and second different carrier frequencies using the resonant circuit, the first and second carrier frequencies being respectively sufficiently proximate to the resonant frequency such that signals communicated based on the resonant frequency can be acquired by demodulating based on the resonant frequency, wherein transmissions between the base station and remote transponder circuit are carried out using respective carrier frequencies which correspond to the first and second carrier frequencies; and the base station performing an error check upon one of the respective carrier frequencies being an initially-used carrier frequency and the base station selecting one of the first and second carrier frequencies based upon the error check and based upon a signal sent from the transponder circuit.

19. The method of claim 18, wherein selecting one of the first and second carrier frequencies based upon a signal sent from the transponder circuit includes determining whether to use the first or second carrier frequencies based upon an ability to acquire signals communicated via the resonant circuit and the first carrier frequency.

20. The method of claim 18, wherein the first and second carrier frequencies are respectively sufficiently proximate to the resonant frequency such that signals communicated based on the resonant frequency can be respectively acquired by demodulating based on the first and second carrier frequencies.

* * * * *